March 4, 1969          H. R. CHOPE          3,431,417
ENERGY REFLECTION APPARATUS FOR MEASURING A PHYSICAL VARIABLE
Original Filed May 27, 1963
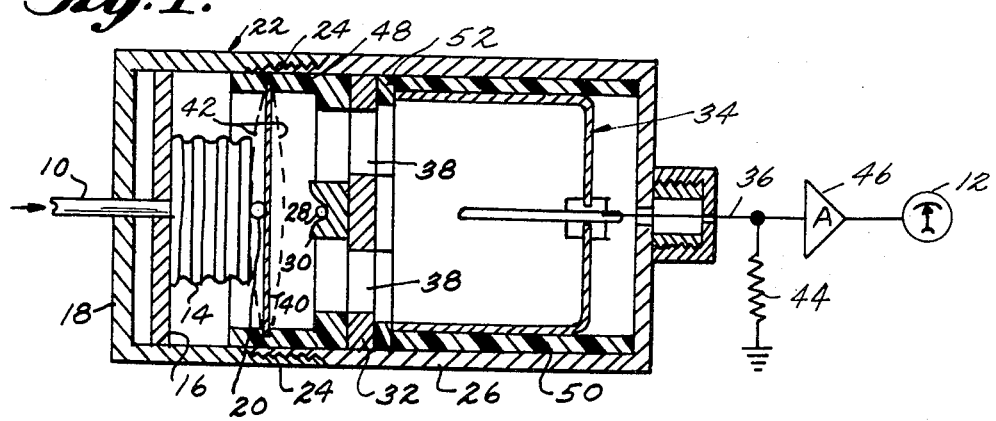
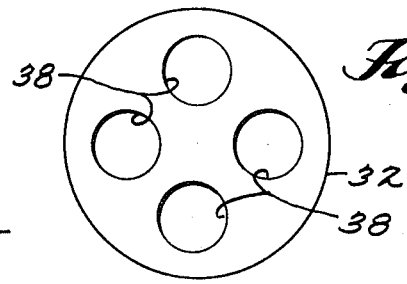
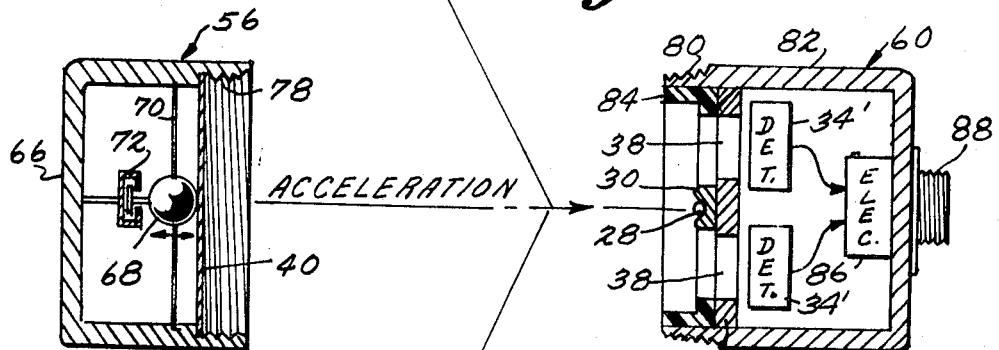
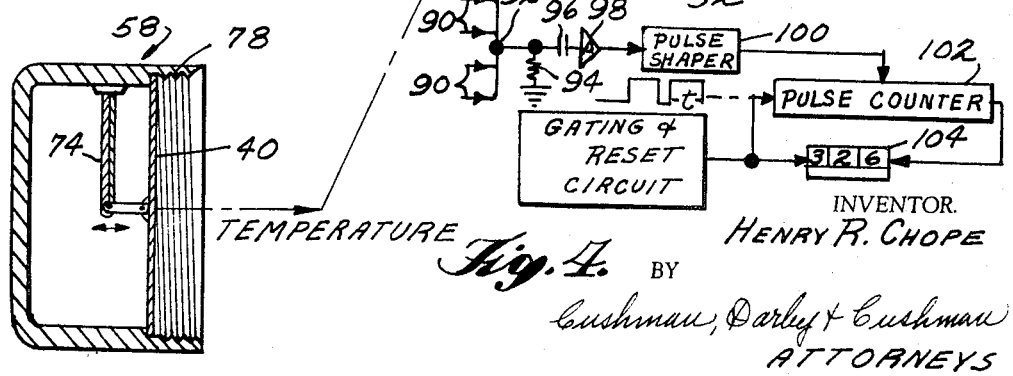
INVENTOR.
HENRY R. CHOPE
BY
Cushman, Darby & Cushman
ATTORNEYS

United States Patent Office 3,431,417
Patented Mar. 4, 1969

3,431,417
ENERGY REFLECTION APPARATUS FOR MEASURING A PHYSICAL VARIABLE
Henry R. Chope, Columbus, Ohio, assignor to Industrial Nucleonics Corporation, a corporation of Ohio
Continuation of application Ser. No. 283,406, May 27, 1963. This application Dec. 29, 1966, Ser. No. 606,451
U.S. Cl. 250—83.3      26 Claims
Int. Cl. G01t *1/16*

ABSTRACT OF THE DISCLOSURE

Disclosed herein is a system for measuring the distance between a reflector and an energy source-detector arrangement, which are relatively movable bodily so as to effect modification of the reflected energy in accordance with variations in the relative body positions of the source-detector and reflector toward and away from each other.

---

This application is a continuation of my copending application Serial No. 283,406, now abandoned, which was a continuation-in-part of my copending application Serial No. 56,849 filed September 19, 1960, now Patent No. 3,158,028.

This invention relates generally to measuring transducers for sensing and measuring a variety of physical variables including mechanical displacements, velocities, accelerations, temperatures, pressures, and thickness of objects, and more specifically it relates to measuring transducers in which a physical variable is coupled through a radiation field to an element whose output is an electrical current or voltage signal.

As used herein the term "transducer" denotes a device for measuring a physical variable by translating that variable to a signal of proper form and magnitude for further display or processing. For example, an extremely simple transducer is a thermo-couple which translates a temperature to be measured to a corresponding electrical voltage. Further, as used herein, the word "transducer" is essentially equivalent to the words "measuring device," "measuring gauge," and "gauge." The terms "measuring system" or "transducer system" are used at various times and usually include in addition to a transducer varying degrees of associated data processing and display equipment.

The term "radiation sources" or "source of radiation" is interpreted herein to mean a radioactive isotope which emits radiation caused by the decay of the isotope. The "radiation" may consist of subatomic particles, such as alpha and beta particles, or may consist of true electromagnetic radiation, such as gamma radiation or radioisotope produced X radiation.

A large class of measuring instruments couple a physical variable to a pointer reading through various combinations of mechanical gears, cams, or levers. Such mechanical instruments possess the advantage of simplicity. Nevertheless, they have the difficulty of requiring frequent adjustment and resetting to maintain process mechanical alignment. Other measuring instruments translate a physical variable, such as temperature, pressure, or displacement, to an electrical signal by varying or modifying a magnetic field. Such instruments have the disadvantage that they are often heavy and bulky, because of the high weight of magnetic core material and the associated copper wire used for various turns about the core. A survey of conventional measuring instruments or transducers can be found in the article, "Chemical Engineering's Guide to Process Instrument Elements," by T. R. Olive and S. Danatos, Chemical Engineering, June 1957.

Radiation transducers of the type to which this application generally refers are disclosed and claimed in my above-mentioned parent Patent No. 3,158,028. In that application a new class of transducers which utilize radiation is disclosed, and such transducers will accurately and reliably measure physical properties, including, but not limited to, mechanical displacements, velocity, acceleration, temperature, pressure, and mechanical thickness. A variety of such transducers is set forth therein in detail, as is the theory of operation of the transducers and their associated electrical and electronics equipment for providing an electrical output which corresponds either in digital or analog form to the variations in the physical variable being measured. Generally speaking, in that application a radioactive source provides a beam which is directed toward one or more detectors, and provision is made for varying the beam or radiation field in any one of various ways in accordance with variations in the physical variable being measured. Specifically, the distance between source and detector is varied, or the angle or the amount of shielding between the source and detector is varied, to regulate the amount of radiation reaching the detector. Several different types of mechanical translators, i.e., apparatus for changing the physical variable into a mechanical movement or displacement, are employed in effecting such variances to regulate, modulate or modify the radiation field.

The present application has for one of its objects the provision of a measuring device or transducer apparatus of the type described, except that the detected radiation is that which results from reflection and the reflection is varied in accordance with the physical variable being measured.

As a specific example, the radiation source and detector in accordance with this invention, both face a radiation reflector, the position of which may be varied by a mechanical translator. In this manner, the radiation field is modulated correspondence with variations in the physical variable, and in the specific examples detailed herein, the path length of the radiation from the source back to the detector is so varied in that manner.

By utilizing a radiation reflector which is itself changed in position by a mechanical translation of the physical variable being sensed, the advantage of standardizing the source and detector portion of the transducer becomes available. That is, various types of mechanical translators, e.g., ones which change predetermined variation ranges of pressure, temperature, mechanical displacement, or acceleration, into a predetermined range of movements of the reflector may be employed interchangeably with the same source and detector arrangement.

It is, therefore, another object of this invention to provide radiation transducer equipment which can be standardized at least as far as the radiation source and detection means is concerned, for use with a variety of different types of mechanical translators, the output of the transducer for measuring any one of the different physical variables having the same signal format and range.

Other objects and advantages of this invention will become apparent to those of ordinary skill in the art upon reading the appended claims and the following detailed description of the invention in conjunction with the drawing, in which:

FIGURE 1 illustrates in longitudinal cross section one embodiment of this invention for measuring variations in pressure;

FIGURE 2 is a face view of a radiation collimator and source support;

FIGURE 3 illustrates another embodiment of this invention with a standardized source and detector to which any one of the three illustrated mechanical translators may be secured; and FIGURE 4 schematically shows the electronics which may be employed with either of the detectors of FIGURES 1 and 3 to effect a digital output.

In the FIGURE 1 embodiment, variations in pressure which are introduced through tube 10 may be noted in analog form on meter 12. To accomplish this, the pressure variations are applied to the interior of pressure bellows 14, the backside of which is held stationary by support 16, which, in turn, is secured in any suitable manner to the housing or casing 18. At the other end of the bellows 14 is a coupling 20, which may be in the form of a ball, for example. In terms of what has been said in the preamble above, the elements so far described in detail and contained in casing 18 may be referred to as a "mechanical translator" 22. As indicated by threads 24, the mechanical translator casing 18 is detachable from a second casing 26.

In the embodiment of FIGURE 1, a suitable radiation source 28 disposed in a shield 30 is centrally secured to a radiation port and collimator element 32, which is fully shown in FIGURE 2. To the rear (rightward in FIGURE 1) of the collimator 32 is a detector 34, for example of the ionization chamber type, which is suitably connected to an ionizing potential (not shown) and the output of which is coupled externally via line 36. It will be noted in FIGURE 1 that both the source 28 and detector 34 face in the same general direction, i.e., leftwardly, with access to the detector being through several ports 38 in collimator 32.

In the embodiment being described, the radiation reflector means 40, which may be a circular reflective sheet-like membrane or diaphragm, is fixedly secured at its peripheral edge within the source and detector casing 26. The longitudinal position therein of reflector 40 is such that coupling ball 20 (which may be connected to reflector 40 magnetically for example so as to be readily detachable therefrom when a different type mechanical translator is to be employed) causes the reflector to bow by being thereby moved at its central point leftwardly or rightwardly, as indicated by the dash lines 42, in accordance with changes in the pressure introduced through tube 10. In effect, such movement of reflector 42 changes the distance between source 28 and detector 34. That is, the radiation path length is thereby changed. This modifies or modulates the output signal of detectors 34 to cause on line 36 an output signal which varies as a function of the variations in pressure introduced through tube 10. This signal is developed into a voltage signal across resistor 44, which, in turn, is amplified at 46 and presented to meter 12 for visual readout of the instant value of the variable being measured.

It will be noted that the reflector 42 is mounted at its peripheral edge in a radiation absorbing wall of protection material 48, and such material also is disposed between detector 34 and the exterior of casing 26, as at 50. Further, there is a radiation absorbing disc 52 with portholes similar to ports 38 between collimator 32 and the window of detector 34.

"Reflector," as used herein, is all-inclusive of the ways of returning radiation, and specifically includes the well-known backscatter method. The type of material that may be employed to effect the desired reflection is any type which will return a significant amount of the radiation and not transmit it through the material or absorb it to any exceptional degree. Backscatter gauges for measuring thickness for example, are known in the art as may be noted by reference to the Hare Patent Re. 22,531, as well as to the Foster Patent 2,964,631 which is assigned to the assignee of the present invention.

In FIGURE 3, any one of the different types of mechanical translators 54, 56 or 58 may be threadedly secured interchangeably with the source and detector head 60. The mechanical translator 54 is of the type that changes movements of rod 62 into displacement of radiation reflector 40 which, in this instance, is secured directly to the translator casing 64. On the other hand, mechanical translator 56 converts acceleration into displacement of its radiation reflector 40, which also is secured to the translator casing 66. To the central area of the back or left side of reflector 40 is connected a ball-like mass 68 which, in turn, is flexibly mounted by a diaphragm 70. A damping arrangement 72 damps movement of mass 68 during acceleration and deceleration of the whole transducer which accordingly operates as an accelerometer.

The third mechanical translator 58 in FIGURE 3 utilizes a bimetallic element 74 to convert temperature variations into displacements of its radiation reflector 40, which is also secured to the respective casing 76.

Any one of the three mechanical translators 54, 56, and 58 in FIGURE 3 may be separately secured detachably to the source and detector head 60 by respective threads 78 and 80, in which position the radiation reflector is in abutment with the outer end of casing 82 and the radiation absorbing liner 84. Radiation reflected by reflector 40 passes through the ports 38 and collimator 32 to a detector, or, as illustrated, several detectors 34'; which are respectively disposed at each of the four ports 38; the outputs of the detectors are applied to the electronics circuitry 86 in the rear of casing 82; and the output thereof may be connected externally through coupling 88 to a digital count displayer, or therethrough to an antenna transmission system (not shown), or to a servo system (not shown) for regulating the physical variable being measured.

The electronic circuitry 86 in the source and detector head 60 of FIGURE 3 may be similar to that illustrated in FIGURE 4 wherein each of the input lines 90 represents a detector output line. The detector outputs are combined at junction 92 and developed into a voltage signal across the detector load resistor 94, which is, in turn, coupled by condenser 96 to an amplifier 98. The voltage signals that are so developed and amplified are generated in response to individual pulses, and, consequently, the signals across resistor 94 are also individual pulses. Amplifier 98 is of the high-speed type, as are the other electronic components, in order to handle the necessary bandwidth all as disclosed in the aforementioned parent application. The output from the high-speed pulse amplifier 98 is fed to a pulse shaper 100, which performs several functions. Pulses whose amplitudes are below some predetermined threshhold value are clipped or otherwise removed by the pulse shaper, and differentiating networks therein are further used to sharpen the leading edge of each pulse. The resulting pulses are then of approximately equal amplitude, and are applied to an electronic pulse counting circuit 102 for numerical indication by a readout counter 104 which is disposed externally of the transducer casing. For purposes of determining the number of pulses per unit of time, a gating and reset circuit 106 is employed to reset both counters 102 and 104 and gate them on repeatedly for successive units of $t$ seconds. As fully explained in the aforementioned parent Patent No. 3,158,028, the number of pulses that occur during each successive unit of time is respectively related to the successive values of the physical variable being measured. Hence, successive time "bundles" or trains of pulses are counted and tabulated. Such trains of pulses may be used in data processing devices or digital computers designed to receive information in terms of pulse trains or pulse sequences. Statistical fluctuations may vary the number of pulses provided by the detectors, but by selecting sufficiently high pulse rates and by designing broadband electronic elements, the errors caused by such statistical fluctuations above the average count rate can be minimized, thus yielding an output signal in digital form which in successive unit time periods quite accurately indicate by their numerical differences the variations of the physical variable being measured.

As previously indicated relative to FIGURE 1, the FIGURE 4 equipment can be used to measure the distance of the radiation path length from the source in FIGURE 3 to the reflector and back to the detectors. That is, either gage 12 in FIGURE 1 or counter 104 in FIGURE 4 may be calibrated in terms of distance between the reflector and either the source or detectors, to provide, along with the circuitry following the detectors, electrical distance measuring means.

Thus, this invention provides for all of the objects and advantages herein stated. Other objects and advantages, and even further modification of the invention, will become apparent to one of ordinary skill in the art upon reading this disclosure. However, it is intended that this disclosure be considered exemplary and not limitative, the scope of the invention being defined by the appended claims.

I claim:
1. In a nucleonics radiation system for measuring a variable, the improvement comprising:
   means for reflecting nucleonic radiation,
   a housing enclosing a reflection type nucleonic radiation source-detector means for directing radiation onto said reflecting means and indicating radiation reflected therefrom,
   means for causing relative movement bodily between the two aforesaid means toward and away from each other to effect modulation of the said reflected radiation in accordance with variations in the relative body positions of said source-detector and reflecting means toward and away from each other, and
   electrical distance measuring means connected to said source-detector means for operating on said modulated radiation indicated thereby to provide a signal varying as the distance between said source-detector and reflecting means.

2. In a nucleonics radiation system for measuring a variable, the improvement comprising:
   means for backscattering nucleonic radiation,
   a housing enclosing a backscatter type nucleonic radiation source and detector gage for directing radiation onto said backscattering means and indicating radiation backscattered therefrom,
   said backscattering means and gage being relatively movable bodily toward and away from each other for modulating the backscattered radiation in accordance with variations in the relative body positions of said backscattering means and gage toward and away from each other, and
   means connected to said detector gage for indicating the distance between said backscattering means and gage.

3. Nucleonic radiation apparatus for indicating relative to said apparatus the position of a nucleonic radiation reflective body which is relatively movable bodily toward or away from said apparatus, comprising:
   nucleonic radiation proof housing means,
   source means in said housing means for directing said nucleonic radiation therefrom toward said radiation reflective body,
   nucleonic radiation detection means disposed in said housing means adjacent said source means for detecting source radiation reflected by said radiation reflective body, and
   electrical distance measuring means connected to said detection means for providing an output signal varying as the distance between said reflective body and said source and detection means.

4. In a nucleonics radiation transducer apparatus for measuring a physical variable, the improvement comprising:
   source means for directing said nucleonic radiation in a general direction,
   movable nucleonic radiation reflective means disposed in said direction for varying the effective radiation path length from said source means to at least part of said reflective means in acordance with variations in position of said reflective means,
   means for detecting nucleonic radiation reflected from said reflective means to provide a signal related to the instant relative positions of said source and reflective means and therefore the current value of said variable, and
   encasing means for enclosing said source, reflecting and detecting means in a nucleonic radiation shielded housing.

5. Apparatus as in claim 4 wherein said movable radiation reflective means includes a reflecting sheet capable of reflecting nucleonic radiation and fixedly secured at its outer edge but bendable inwardly thereof so as to be movable toward and away from said source means.

6. Apparatus as in claim 4 including means for supporting said source means intermediate said reflective and detecting means comprising a plate having a plurality of collimating radiation ports disposed about its central area, said source means being affixed at said central area and said detecting means being disposed to detect the reflected radiation passing through said ports.

7. Apparatus as in claim 4 and further including electrical means connected to said detecting means for developing a pulse train having pulses varying in number per successive equal-length periods of time as digital representatives of successive values of said variable.

8. Apparatus as in claim 7 including means for counting the pulses in said pulse train during each said period of time.

9. Apparatus as in claim 4 and further including means for translating changes in said physical variable into movements in said reflective means.

10. Apparatus as in claim 9 wherein said physical variable is pressure and said translating means includes pressure bellows connected to said reflective means on the side thereof opposite said source means.

11. Apparatus as in claim 9 wherein said physical variable is mechanical displacement and said translating means includes a rod connected to said reflecting means on the side thereof opposite said source means.

12. In a nucleonics radiation transducer apparatus for measuring a physical variable, the improvement comprising:
   source means for directing said radiation in a general direction,
   movable radiation reflective means disposed in said direction for varying the effective radiation path length from said source means to at least part of said reflective means in accordance with variations in position of said reflective means,
   means for detecting radiation reflected from said reflective means to provide a signal related to the instant relative positions of said source and reflective means and therefore the current value of said variable, and
   means for translating changes in said physical variable into movements in said reflective means, wherein said physical variable is acceleration and said translating means includes a damped flexible-diaphragm-supported mass connected to said reflecting means on the side thereof opposite said source means.

13. In a nucleonics radiation transducer apparatus for measuring a physical variable, the improvement comprising:
   source means for directing said radiation in a general direction,
   movable radiation reflective means disposed in said direction for varying the effective radiation path length from said source means to at least part of said reflective means in accordance with variations in position of said reflective means,
   means for detecting radiation reflected from said reflective means to provide a signal related to the instant relative positions of said source and reflective means and therefore the current value of said variable, and means for translating changes in said physical variable into movements in said reflective means, wherein said physical variable is temperature and said translating means includes bimetallic temperature sensitive device connected to said reflecting means on the side thereof opposite said source means.

14. A nucleonics radiation transducer apparatus for measuring a physical variable comprising:
- a first casing having a mechanical translator for changing said variable into a given movement inside said casing,
- a second casing aligned with and detachably secured to said first casing and having radiation source and detector means both facing the first casing, and
- a radiation reflective diaphragm effectively secured to one of said casings at a position between said source means and translator, said diaphragm being connected to said translator for movement thereby to effect modulation of the reflected radiation received by said detector means to cause an output therefrom which varies as a function of variations in said variable.

15. Apparatus as in claim 14 wherein said source and detector means are such that the latter fully responds to all radiation changes caused by movement of said translator in a predetermined movement range.

16. Apparatus as in claim 14 wherein said mechanical translator is a pressure transducer capable of changing a desired range of pressure variations into said predetermined movement range.

17. Apparatus as in claim 14 wherein said mechanical translator is a displacement transducer capable of handling a desired range of displacements and translating same into said predetermined movement range.

18. Apparatus as in claim 14 wherein said mechanical translator is an acceleration transducer capable of changing a desired range of accelerations into said predetermined movement range.

19. Apparatus as in claim 14 wherein said mechanical translator is a temperature transducer capable of changing a desired range of temperature variations into said predetermined movement range.

20. For use with a housed radiation source and detection means both facing an open end of the housing for purposes of nucleonically measuring a physical variable, apparatus comprising:
- a casing having an open end to be secured to the said housing open end,
- a diaphragm secured at its outer edge to the interior of said casing inwardly of its said open end, said diaphragm being radiation reflective at least on its outer side, and
- a mechanical translator connected to said diaphragm on its inner side for transversely moving said diaphragm in accordance with changes in said physical variable.

21. In a nucleonics radiation system for measuring a variable, the improvement comprising:
- means for reflecting nucleonics radiation,
- a housing enclosing a reflection type nucleonic radiation source-detector means for directing continuous radiation onto said reflecting means and continuously indicating the radiation intensity reflected therefrom,
- means for causing relative movement bodily between the two aforesaid means toward and away from each other to effect modulation of the said reflected radiation in accordance with variations in the relative body positions of said source-detector and reflecting means toward and away from each other, and
- electrical distance measuring means connected to said source-detector means for operating on said modulated radiation indicated thereby to provide a signal varying as the distance between said source-detector and reflecting means.

22. In a nucleonics radiation system for measuring a variable, the improvement comprising:
- means for backscattering nucleonic radiation,
- a housing enclosing a backscatter type nucleonic radiation source and detector gage for directing continuous radiation onto said backscattering means and continuously indicating the intensity of the radiation backscattered therefrom,
- said backscattering means and gage being relatively movable bodily toward and away from each other for modulating the backscattered radiation in accordance with variations in the relative body positions of said backscattering means and gage toward and away from each other, and
- means connected to said detector gage for indicating the distance between said backscattering means and gage.

23. Nucleonic radiation apparatus for indicating relative to said apparatus the position of a nucleonic radiation reflective body which is relatively movable bodily toward or away from said apparatus, comprising:
- nucleonic radiation proof housing means,
- source means in said housing means for directing said nucleonic radiation therefrom toward said radiation reflective body continuously,
- nucleonic radiation detection means disposed in said housing means adjacent said source means for continuously detecting source radiation reflected by said radiation reflective body, and
- electrical distance measuring means connected to said detection means for providing an output signal continuously varying as the intensity of said reflected radiation to indicate the distance between said reflective body and said source and detection means.

24. In a nucleonics radiation transducer apparatus for measuring a physical variable, the improvement comprising:
- source means for continuously directing said nucleonic radiation in a general direction,
- movable nucleonic radiation reflective means disposed in said direction for varying the effective radiation path length from said source means to at least part of said reflective means in accordance with variations in position of said reflective means,
- means for continuously measuring the intensity of the nucleonic radiation reflected from said reflective means to provide a signal related to the instant relative positions of said source and reflective means and therefore the current value of said variable,
- and encasing means for enclosing said source, reflecting and detecting means in a nucleonic radiation shielded housing.

25. Apparatus for indicating relative to itself the position of a particulate energy reflective body which is relatively movable bodily toward or away from said apparatus, comprising:
- particulate energy proof housing means,
- source means in said housing means for directing said particulate energy therefrom toward said energy reflective body,
- particulate energy detection means disposed in said housing means adjacent said source means for detecting said energy reflected by said energy reflective body, and
- electrical distance measurement means connected to said detection means for providing a signal varying as the distance between said reflective body and said source and detection means.

26. Apparatus for indicating relative to itself the position of an X-ray energy reflective body which is relatively movable bodily toward or away from said apparatus, comprising:
- X-ray energy proof housing means, source means in said housing means for directing said X-ray energy therefrom toward said energy reflective body, X-ray energy detection means disposed in said housing means adjacent said source means for detecting said energy reflected by said energy reflective body, and electrical distance measurement means connected to said detection means for providing a signal varying as the distance between said reflective body and said source and detection means.

References Cited

UNITED STATES PATENTS

| 3,154,681 | 10/1964 | Ziegler | 250—83.3 |
| 2,067,262 | 1/1937 | Demontvignier et al. | 250—231 X |
| 2,449,953 | 9/1948 | Rippingville | 250—231 X |

ARCHIE R. BORCHELT, *Primary Examiner.*

U.S Cl. X.R.

250—43.5